(12) United States Patent
Moen et al.

(10) Patent No.: US 11,335,961 B2
(45) Date of Patent: *May 17, 2022

(54) POWER SUPPLY SYSTEM

(71) Applicant: Siemens Energy AS, Oslo (NO)

(72) Inventors: Stian Skorstad Moen, Sjetnemarka (NO); Arve Skjetne, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 135 days.

This patent is subject to a terminal disclaimer.

(21) Appl. No.: 16/499,264

(22) PCT Filed: Mar. 29, 2018

(86) PCT No.: PCT/EP2018/058145
§ 371 (c)(1),
(2) Date: Sep. 28, 2019

(87) PCT Pub. No.: WO2018/185000
PCT Pub. Date: Oct. 11, 2018

(65) Prior Publication Data
US 2021/0111439 A1    Apr. 15, 2021

(30) Foreign Application Priority Data

Apr. 5, 2017  (GB) ...................................... 1705513
Apr. 5, 2017  (GB) ...................................... 1705520

(51) Int. Cl.
*H01M 10/42*     (2006.01)
*H01M 10/613*    (2014.01)
(Continued)

(52) U.S. Cl.
CPC ..... *H01M 10/4257* (2013.01); *H01M 10/482* (2013.01); *H01M 10/486* (2013.01);
(Continued)

(58) Field of Classification Search
CPC .......... H01M 10/4257; H01M 10/482; H01M 10/486; H01M 10/613; H01M 10/625;
(Continued)

(56) References Cited

U.S. PATENT DOCUMENTS 6,094,031 A    7/2000  Shimane et al.
6,208,117 B1   3/2001  Hibi
(Continued)

FOREIGN PATENT DOCUMENTS

EP    2544331 A2    1/2013
EP    2866325 A1    4/2015
(Continued)

OTHER PUBLICATIONS

International search report and written opinion dated Jul. 11, 2018 for corresponding PCT/EP2018/058145.

*Primary Examiner* — Victoria H Lynch

(57) ABSTRACT

A DC energy storage unit with a plurality of energy storage modules, each energy storage module including a plurality of electrochemical energy storage devices electrically connected in series; an internal control unit in the energy storage module; a power supply for the internal control unit; and a wireless communication system; wherein the total voltage of the plurality of energy storage devices in series is greater than or equal to 40 V DC, wherein the plurality of energy storage modules are coupled together in series, or in parallel, each energy storage unit including a wireless gateway for communication between the energy storage unit controller and each energy storage module; wherein each energy storage module further has a housing, the housing at least partially having a non magnetic material.

8 Claims, 6 Drawing Sheets

(51) Int. Cl.
*H02J 50/80* (2016.01)
*H01M 10/48* (2006.01)
*H02J 1/10* (2006.01)
*H01M 10/6556* (2014.01)
*H01M 10/6567* (2014.01)

(52) U.S. Cl.
CPC ............ *H01M 10/613* (2015.04); *H02J 1/10* (2013.01); *H02J 50/80* (2016.02); *H01M 10/6556* (2015.04); *H01M 10/6567* (2015.04); *H01M 2010/4271* (2013.01); *H01M 2220/20* (2013.01); *H02J 2310/42* (2020.01); *H02J 2310/44* (2020.01)

(58) Field of Classification Search
CPC ........... H01M 10/654; H01M 10/6555; H01M 10/6556; H01M 10/6557; H01M 10/6567; H01M 2010/4271; H01M 2220/20; H02J 1/10; H02J 2310/40; H02J 2310/42; H02J 2310/44; H02J 50/80; H02J 7/0021; H02J 7/1423; Y02E 60/10
See application file for complete search history.

(56) References Cited

U.S. PATENT DOCUMENTS

| | | | |
|---|---|---|---|
| 6,605,922 B2 | 8/2003 | Tamai et al. | |
| 8,917,039 B2 | 12/2014 | Yugo | |
| 2009/0289046 A1* | 11/2009 | Richmond | A41D 13/0051 219/211 |
| 2011/0248668 A1 | 10/2011 | Davis et al. | |
| 2012/0159220 A1 | 6/2012 | Winkler et al. | |
| 2013/0090795 A1* | 4/2013 | Luke | B60L 1/14 701/22 |
| 2014/0035365 A1 | 2/2014 | Yoo | |

FOREIGN PATENT DOCUMENTS

| | | |
|---|---|---|
| EP | 3029800 A1 | 6/2016 |
| JP | 2013099002 A | 5/2013 |
| KR | 20030044861 A | 6/2003 |
| WO | 2010118039 A1 | 10/2010 |
| WO | 2012061262 A1 | 5/2012 |
| WO | 2016121644 A1 | 8/2016 |

* cited by examiner

POWER SUPPLY SYSTEM

CROSS REFERENCE TO RELATED APPLICATIONS

This application is the US National Stage of International Application No. PCT/EP2018/058145 filed Mar. 29, 2018, and claims the benefit thereof. The International Application claims the benefit of United Kingdom Application Nos. GB1705513.8 and GB1705520.3, both filed Apr. 5, 2017. All of the applications are incorporated by reference herein in their entirety.

FIELD OF INVENTION

This invention relates to a power supply system, in particular for an electrochemical cell, or battery, providing electrical energy to an end user.

BACKGROUND OF INVENTION

Stored electrical energy type power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with batteries to power the vessel when close to shore, using diesel generators offshore to recharge the batteries. In many Scandinavian countries the availability of electricity from renewable energy sources to use to charge the batteries means that a fully electric vessel is desirable, with no diesel, or other non-renewable energy source. Whether hybrid, or fully electric, the batteries may be charged from a shore supply when docked. The development of battery technology to achieve power units that are reliable enough for prolonged use as the primary power source must address certain technical issues.

SUMMARY OF INVENTION

In accordance with a first aspect of the present invention, a DC energy storage unit comprises a plurality of energy storage modules, each energy storage module comprising a plurality of electrochemical energy storage devices electrically connected in series; an internal control unit in the energy storage module; a power supply for the internal control unit; and a wireless communication system; wherein the total voltage of the plurality of energy storage devices in series is greater than or equal to 40 V DC, wherein the plurality of energy storage modules are coupled together in series, or in parallel, each energy storage unit comprising a wireless gateway for communication between the energy storage unit and each energy storage module; wherein each energy storage module further comprises a housing, the housing at least partially comprising a non magnetic material.

Each module of the energy storage unit is substantially gas tight in its housing and each energy storage unit may be substantially gas tight.

The non-magnetic material may comprise a polymer material, in particular, one of polythene, polyamide, or thermoplastic.

The total voltage of a module is typically in the range of 50V DC to 200V DC, but advantageously the total voltage of the plurality of energy storage devices in series is greater than or equal to 100 V DC.

The power supply may comprise one or more of the energy storage devices in the module, electrically connected to the internal control unit through a rectifying unit.

The rectifying unit may comprise one of a diode, transistor, rectifying bridge, or thyristor.

The module may further comprise sensors for detecting at least one of temperature, energy storage device voltage, or energy storage device current.

In accordance with a second aspect of the present invention, a DC power supply system comprises a plurality of energy storage units according to the first aspect; a local DC bus connected between each of the units; and a system controller for controlling power availability between the local bus and a DC system bus; wherein the system controller comprises a wireless communication system for communicating with the energy storage modules.

The wireless communication system may comprise a node of a wireless network, the network having a ring, mesh, line, bus, fully connected, tree, star, or point to point topology.

The power supply system voltage may be in the range of 500V DC to 2 KV DC.

However, the power supply system voltage is not restricted and may be lower or higher, as it may be scaled easily to significantly higher voltages, i.e. 1 KV, 10 KV or higher.

The DC system bus may be a system bus of a vehicle, vessel, aircraft, offshore platform, drilling rig, or powered equipment.

BRIEF DESCRIPTION OF THE DRAWINGS

An example of power supply system according to the present invention will now be described with reference to the accompany drawings in which.

DETAILED DESCRIPTION OF INVENTION

Figure 1:
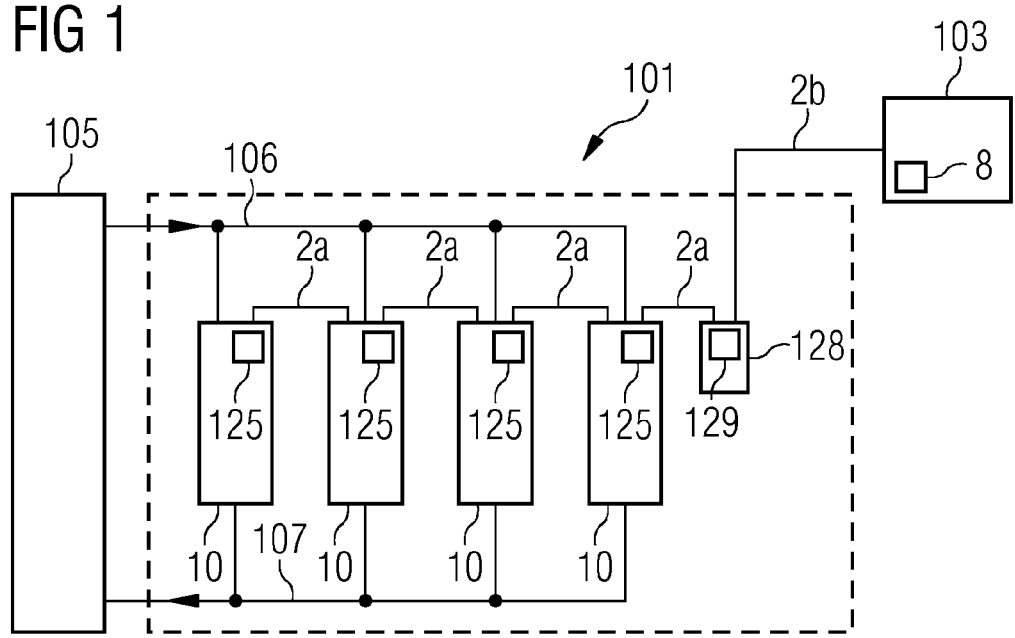
FIG. 1 illustrates an example of a power supply system in which an energy storage module according to the invention may be used.

FIG. 1 illustrates an example of an energy storage system incorporating energy storage modules 10 according to the invention, in particular, for use on a vessel or offshore platform. The system comprises an energy storage unit 101 comprising a plurality of energy storage modules 10 each of which incorporates a plurality of energy storage devices electrically connected together in series (not shown).

Figure 6:
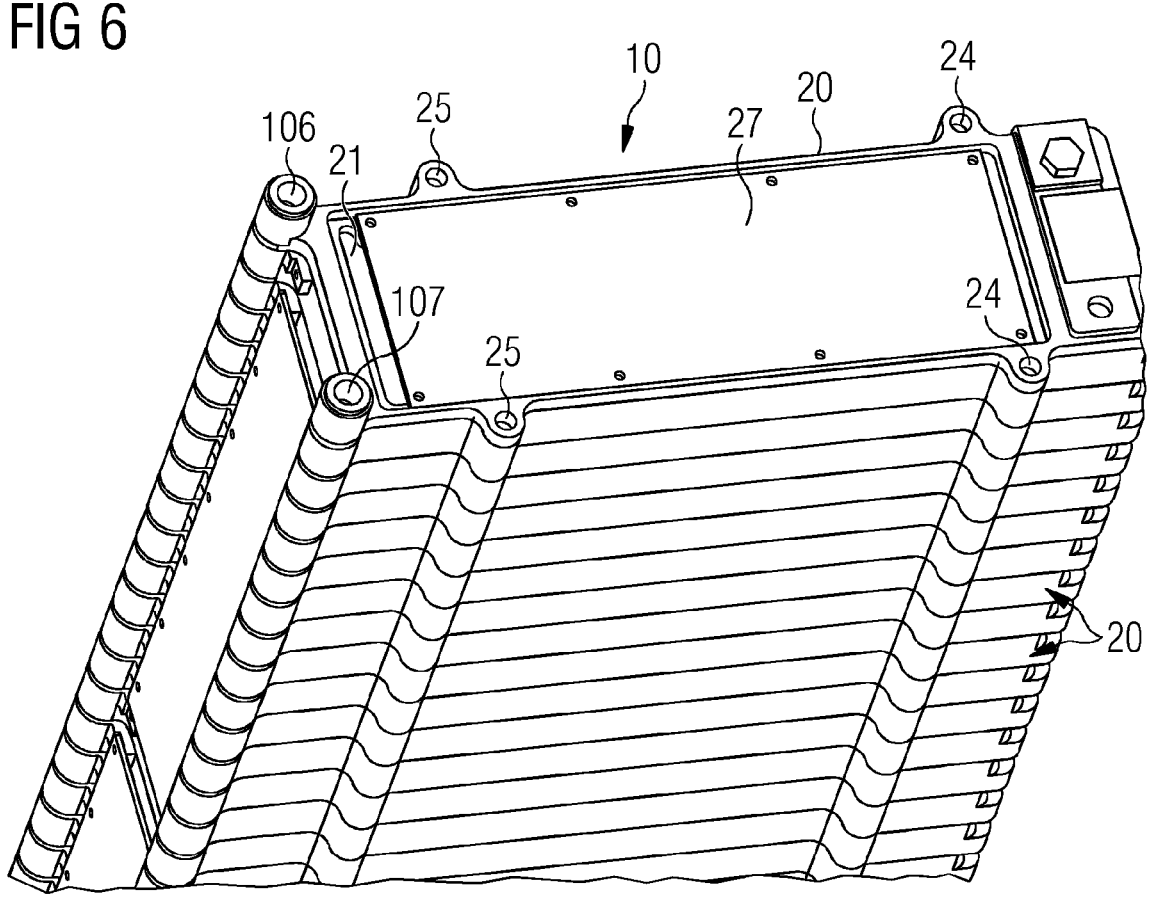
FIG. 6 illustrates how multiple energy storage modules according to the present invention may be stacked together; and, FIG. 7 illustrates more detail of part of the energy storage module.

An energy storage module 10 typically comprises a stack of one or more energy storage devices (not shown), for example battery cells, each mounted in a carrier 20, or cooler, shown in more detail in FIG. 6 and electrically connected together in series with a neighbouring energy storage device, in or on, the next carrier, or cooler. The cells are advantageously prismatic or pouch type cells to get a good packing density. A plurality of energy storage modules may be connected together in series by a DC bus (not shown) to form the energy storage unit, or cubicle 101. A single cell of a module may have a capacity between 20 Ah and 100 Ah, more commonly between 60 Ah and 80 Ah, although cells with a capacity as low as a couple of Ah, or over 100 Ah, may be used. A module typically comprises between 10 and 30 energy storage devices per module 10, although more or fewer cells per module are possible. There may be as many as 40 or 50 modules per cubicle, although typically from 9 to 21 modules per cubicle may be chosen. However, the precise number of modules may be varied according to the requirements of the application.

Each of the modules may comprise a wireless transceiver 125 by which the modules 10 may communicate with a unit controller 128, or directly with a system power controller 103 of the vessel, allowing the controller to determine which modules to charge or discharge, according to the requirements of the vessel and the available stored energy. The communication may include information such as voltage or temperature of each module, or each cell in the module, or may be used to send command signals to the modules. The system power controller 103 controls transmission of power between a DC bus 2b of the energy storage system and the vessel DC bus. Within each module, there may be wired connections to sensors for each cell, but the modules 10 are typically robust and may need to be gas tight and water tight, so it is desirable to avoid penetrating the module housing unnecessarily with wires. Thus, each module 10 comprises a housing (126a, 126b) which comprises, at least partially, a non-magnetic material. For example, the module enclosure body (126a) may be made from steel, but end plates (126b) may be made of a polymer material, such as a polyamide. This allows wireless signals to and from the module controller 125 to penetrate the housing through the end plates and provide communication between the unit controller 128 and the module controller.

Conventionally, battery modules have used metallic housings, which act as a Faraday cage, making wireless communication impractical. The present invention overcomes this issue by manufacturing the modules, at least in part, from a non-magnetic material, such as a polymer material, which permits the transmission of communication signals from each module of the DC energy storage unit by wireless communication out to a controller 128 of the energy storage unit, or cubicle 101. The unit or cubicle itself may comprise metallic materials, to dampen signals between the units and so reduce interference from wireless signals in adjacent units. If wireless communication is to be used from a unit to a system controller, a non-magnetic section of the unit housing may be provided to allow signal transmission.

Figure 3:
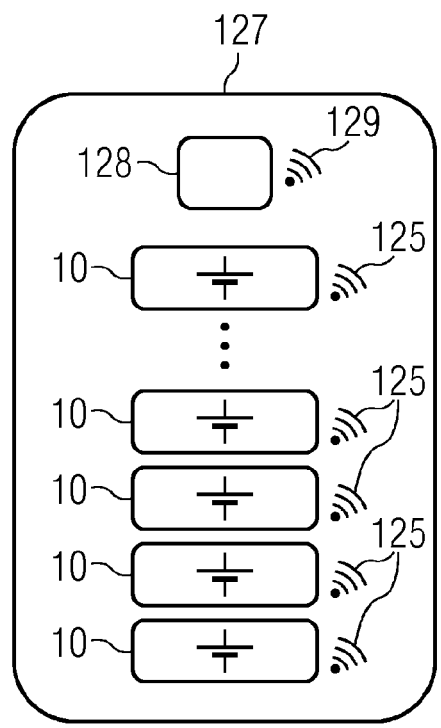

Typically, a plurality of modules 10 are connected together in series by an internal bus 2a which then connects the modules 10 in the system to gateways 129 in each unit 1, or cubicle, as can be seen in more detail in FIG. 3. The gateway connects the modules to the system bus 2b. The cubicle controller 128 may have some decision making capability and may also communicate with the system controller 103. System controller 103 sets limits for the battery system, such as charge and discharge levels, as well as determining load balancing. The system controller 103 may control an optional converter on the bus. Although the energy storage devices of the energy storage modules 10 may be cooled by air cooling, advantageously, the energy storage modules are cooled in a closed cooling system comprising a cooling unit 105 supplying cooling fluid via inlet pipes 106 to each module and receiving cooling fluid returned to be cooled again via outlet pipes 107. The cooling fluid may be supplied to all the modules in parallel and to all energy storage devices of each module in parallel.

Figure 2:
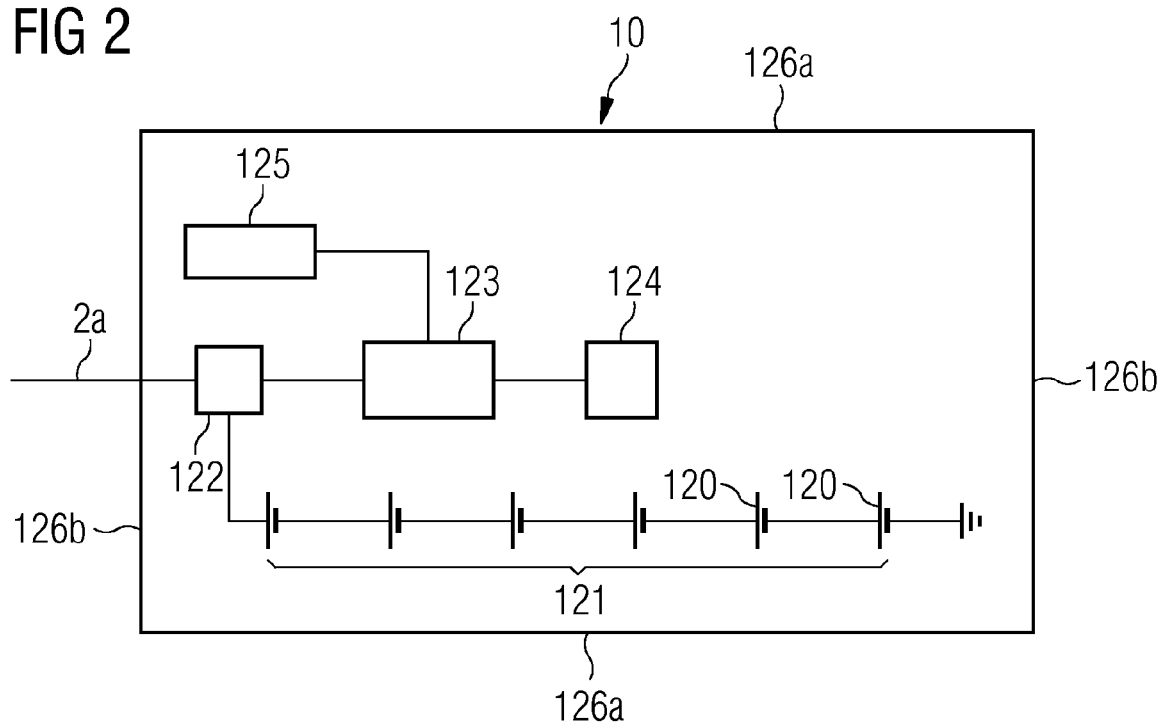
FIG. 2 illustrates an example of an energy storage module according to the invention, for use in the system of FIG. 1; and, FIG. 3 illustrates an example of an energy storage system according to the invention, comprising a plurality of energy storage modules of FIG. 2.

Energy storage systems for supplying DC electrical energy for marine applications, such as systems onboard vessels and offshore platforms, have high voltage and current requirements. They may need to provide voltage levels of 1 KV DC, or higher, which are achieved by combining multiple energy storage modules 10 operating at voltages between 50V DC and 200V DC, typically around 100V DC. More detail of an example of an energy storage module 10 for use in the system of FIG. 1 is shown in FIG. 2. Each module 10 comprises a plurality of energy storage devices 120, connected together in series to provide the required total module voltage 121. Typically, this is of the order of 100V to 150V DC, using energy storage devices each rated at between 3V and 12V. Multiple modules 10 are coupled together as illustrated in FIG. 1 to be able to provide sufficient DC voltage to power the systems on the vessel, for example, 1 KV or more.

A regulator 122 may couple each of the energy storage modules to the internal DC bus 2a. Within each energy storage module is a local control unit 123 with control and monitoring circuitry for such purposes as performing cell balancing, temperature measurement and cell voltage monitoring. The local control unit 123 may receive data from sensors 124, such as temperature measurements, or data from each of the energy storage devices 120, such as voltage or current measurements, that data may be used locally, for example, for cell balancing. Some or all of the data collected locally may need to be supplied to the unit controller 128 or the central power system controller 103 on the vessel or platform, which controls the allocation of power from each energy storage module to main systems, such as the propulsion system, or drilling equipment.

Communicating the measured values to a top system for analysis and control gives rise to certain problems. The voltage difference between each of the modules forming an energy storage system requires galvanic isolation of the electronics. The galvanic isolation circuits have a maximum voltage at which they can operate and so limit the maximum voltage that the energy storage system can handle. High voltage and currents combined with a switching environment present significant noise issues on cables and interfere with effective communication. The more cables the bigger the problem. This noise may propagate into the electronics and affect functionality and reliability. Additionally, there is a cost in installing cables and connections mechanically, both parts and labour. For marine and offshore applications, there are strict regulations relating to fire safety and continued operation in case of flooding. The energy storage modules may need to comply with these requirements, yet for each set of cables additional penetrations through the casing are required. Furthermore, reliability and space saving are important considerations on an offshore platform or vessel, due to the difficulties of access and limited available space.

In the present invention, each module 10 comprises a wireless transceiver 125, the unit controller 128 comprises a wireless communications gateway 129 and the central controller comprises a wireless transceiver 8. As illustrated in FIG. 3, a plurality of energy storage modules 10 may be combined to form an energy storage unit 127 at a higher voltage. Each energy storage module communicates locally with the unit controller 128 including the communication gateway 129. Data is then sent from the unit communication gateway 129 of the energy storage unit 127 to the central power controller 103. In another example, not shown, the individual energy storage modules may send data directly from their internal wireless transceiver 125 and no unit controller, or communication gateway is required. The use of wireless communication 125, 129, 8 between each energy storage module 10, the unit controller 128 and the system controller 103, means that no additional external connections, or penetrations in the module housing are needed. This also has the advantage of reducing noise by removing the communication cables, so improving performance and reliability. The topology of the wireless communication network may be ring, mesh, line, bus, fully connected, tree, star, point to point, or other suitable topology. The energy storage system may be scaled up as required, without encountering further issues of interference that might have occurred in a wired system.

The full benefit of this invention is achieved when combined with an internal power source for the control unit 123 of each energy storage module 10, as then the only opening in the module housing is for the system power, DC bus 2b, rather than for auxiliaries such as communication and local power supplies. This is described in more detail in our co-pending patent application reference no. 2016P22574 GB. As a DC power supply for powering the main systems on a vessel or platform typically operates at a much higher voltage than is required by the control unit, an internal power supply using the energy storage devices must provide a low voltage, which is able to supply a low current, for example when the energy storage module is in long term storage, or in standby mode. Current consumption in these modes may be as low as 200 µA. Required voltage may be between 3V and 12V.

The energy storage devices of the module 10 comprise a plurality of relatively low voltage cells, connected together to give the relatively high voltage required by the vessel system. Thus, the auxiliary supply to the control and monitoring circuits 123 is provided by one or more of the relatively low power cells, rather than transforming from the full module voltage. By taking energy from only one, or just a few of the energy storage devices, the power supply to the circuits does not need to transform the voltage from the module voltage of 100V, or 150V down to the required voltage and a simple LDO linear regulator may be used, or other low power switched regulator. The internal control unit is grounded to the negative pole of the battery, i.e. the lowest potential of the module and connected to the last of the energy storage devices in the series of energy storage devices through a rectifier, or diode.

A power supply using a single energy storage device, or a few such devices, in combination with active cell balancing, increases the efficiency of the complete system dramatically as compared to a system using full voltage buck power supply at all times. This enables the multi cell battery module electronics to be powered from within the battery rather than relying on external power. Thus, it is possible to provide data logging during storage of the module 10; a more robust module, as it does not rely on external wires and cable connections for providing power to the internal circuitry; and a lower cost product, as there is less cabling work to be done on site and fewer penetrations of the module housing and less wiring required. The present invention is applicable for high efficiency power supplies with wide current range. The systems are more reliable, as each energy storage module has its own power supply, rather than sharing a common external power supply, with the risk of all modules ceasing to provide monitoring and control functions if that external power supply fails.

The specific examples of the present invention has been described with respect to energy storage modules for use onboard a vessel, but the invention is equally applicable to any equipment depending on energy storage devices for its power, such as land based electric or hybrid electric vehicles, electric aircraft, drilling rigs and offshore platforms, as well as off-grid onshore powered equipment.

Figure 4A:
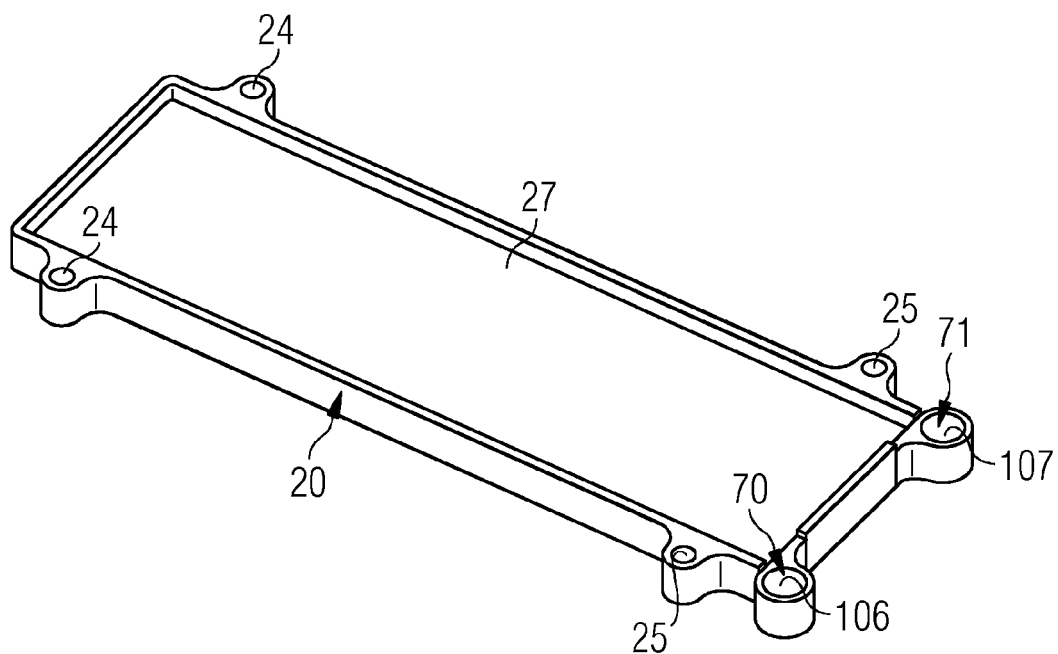
FIGS. 4a and 4b illustrate part of an energy storage module in more detail.
Figure 4B:
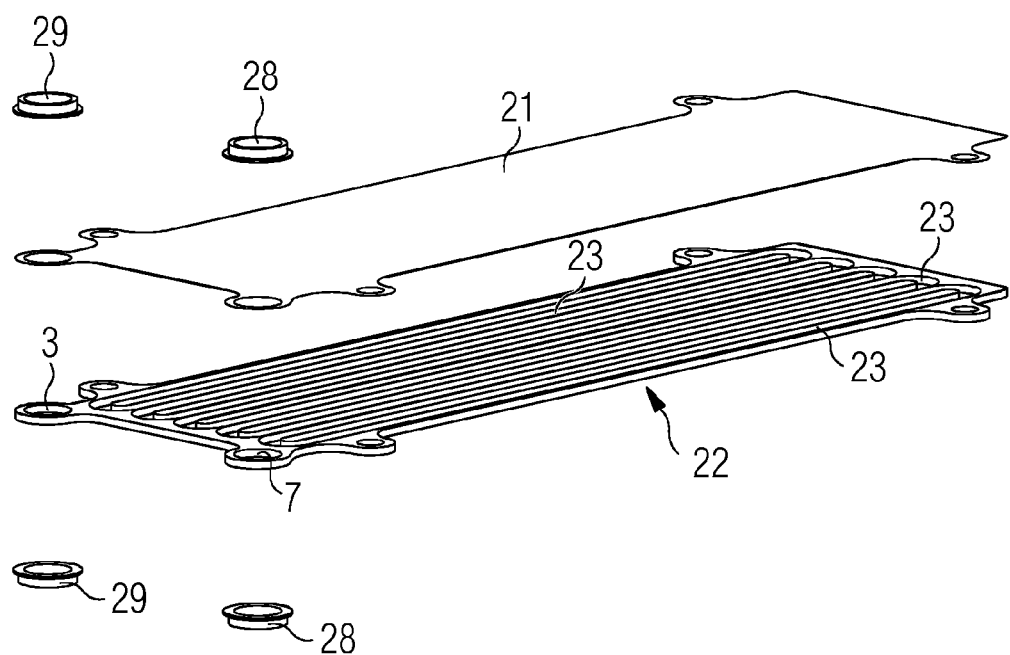

Multiple energy storage units, or cubicles, may be installed on a vessel, or platform, or in any other installation. FIGS. 4a and 4b show more detail of the modules 10. Each module comprises a cooler, or carrier, or casing 20, as shown in FIG. 4a, onto which, or into which, an energy storage device (not shown), such as a battery cell 120, may be fitted. The carrier is typically made from a polymer plastics material for light weight and low cost. The cooler 22 may be formed integral with the carrier, for example by additive manufacturing techniques. FIG. 4b illustrates an example with an integral cooler formed by laminating, or welding, a plate 21 to a series of raised sections 23 formed, typically by moulding, in another piece of the same polymer plastics material. This forms closed channels, or conduits, through which cooling fluid may flow from one end to another. A battery cell may be installed in each carrier 20, for example on outer surface 27 of the cooler. The outer surface of the cooler 22 may be in direct contact with one surface of the battery cell to provide effective cooling over a large surface area, without any direct contact of the cooling fluid to the energy storage device, or cell.

Cooling fluid flows from the inlet pipe 106 through the channels, or conduits 23 of the cooler 22, cooling the cell by thermal transfer from the surface of the cell through the thin tubing 23 to the cooling fluid. The cooling fluid channels or tubing have a typical overall thickness in the range of 5 mm to 20 mm, with a wall thickness in the range of 1 mm to 5 mm and advantageously, no more than 3 mm for a polymer plastics material. The cooling fluid is carried away into the outlet pipe 107 and returned to the cooling unit 105 to be cooled again. The tubing 23, formed under plate 21, covers a substantial part of the cell surface on the side that it contacts, anything from 30% to 75% of the cell surface area on that side of the cell.

Figure 5A:
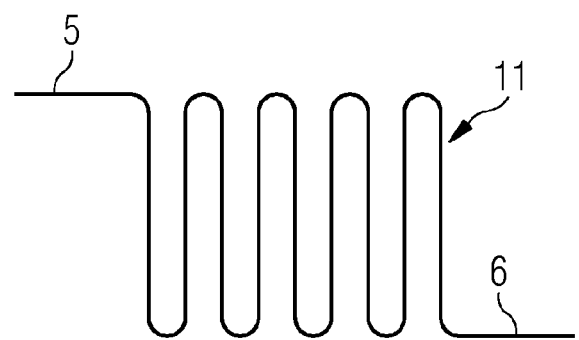
FIGS. 5a and 5b show more detail of coolers which may be used in the examples of FIGS. 4a and 4b.
Figure 5B:
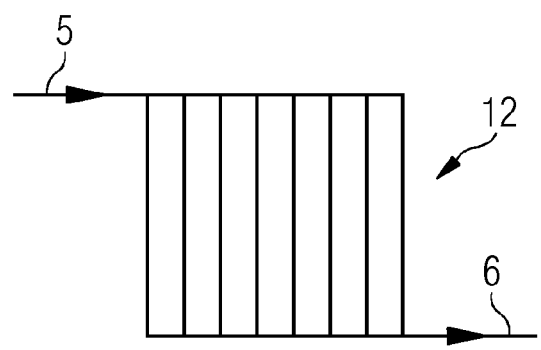

The overall design has a significantly reduced total material weight and cost by using the cooling liquid pipes to flow cooling fluid directly adjacent to the cell surface, instead of conventional cooler block, heat exchanger designs. In addition, this cooling is provided for normal operation, to keep the cell within a temperature range that is beneficial to performance and operational lifetime, rather than as a one off, only in the case of a thermal event. The thin cooling fluid channels 23 may be formed in any suitable form, connected between the inlet and outlet pipes 106, 107 via the tubes 5, 6. Preferably, the cross section of the channels is square to maximise the contact and minimise the amount of plastics material between the cooling fluid and the energy storage device. However, other cross sections could be used, such as circular cross section tubing. The tubing 23 may be in the form of a continuous serpentine 11 connected between the inlet and outlet tubes 5, 6, as shown in FIG. 5a and the example of FIG. 4b, or there may be multiple parallel rows 12 of tubing fed by a common supply from the inlet pipe 106 connected to the inlet tube 5 and exiting through outlet tube 6, as shown in FIG. 5b, to outlet pipe 107.

The tubing 23 may be metal, but more typically is a synthetic material, such as polymer plastics, for example polythene, polyamide, such as PA66 plastics, or thermoplastics such as TCE2, TCE5, or other suitable materials, which may be moulded or extruded, or formed by additive manufacturing techniques to produce the required shape. The tubing material is able to withstand normal operating temperatures of the energy storage modules. An alternative is to form channels walls on a base, for example by moulding, then apply a plate to the upper surface of the walls, which is welded, or laminated, or otherwise fixed in place. The conduits for cooling fluid may have an overall thickness in the range of 5 mm to 20 mm, with a wall thickness in the range of 1 mm to 5 mm, advantageously, no more than 3 mm for a polymer plastics material.

The cell is cooled directly by flowing cooling fluid in the cooling channels over a substantial part of the cell surface, with very little thermal resistance. Conventional cooling arrangements have suffered from hot spots for areas of the cell which were far away from the cooler block, or heat exchanger, but this cooler for each energy storage device avoids this problem. This has the effect of slowing down the aging process of the cell, so increasing its lifetime.

Figure 7:
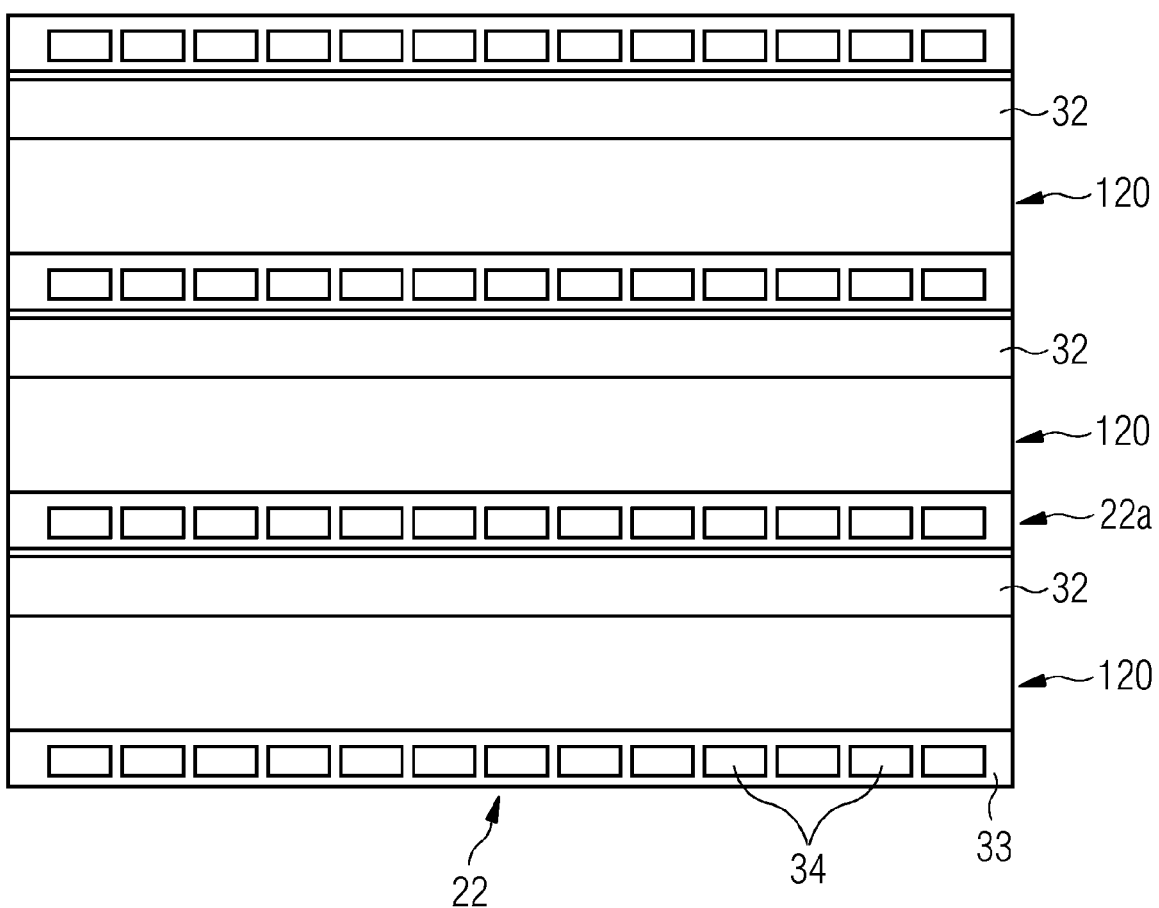

Energy storage modules 10, are formed from a plurality of cells stacked together in their carriers 20, as shown in FIG. 6. Cooling fluid enters the tubes of each cooler from an opening 70 in the common inlet pipe 106 that runs along the stack and exits through an opening 71 in the common outlet pipe 107 that runs along the stack. In a closed system, the cooling fluid is pressurised and circulates around the stack of modules via the common pipes 106, 107 and individual coolers 22 of each module 10. In order to maintain compression of the cell by the carrier 20 to take account of expansion of the cell over time, there needs to be some flexibility to allow for the changes over time. This may be provided by a separate flexible layer 32, as shown in FIG. 7, provided between one surface of the energy storage device 120 and an adjacent cooler 22a. If an insulating layer is used, the insulating layer may perform this function, or with heat transfer controlled by the coolers on either side of the energy storage device, a flexible sheet may be used to ensure that the carrier can still apply pressure. A low pressure is applied, typically below 0.2 bar, on the cell wall to increase performance and lifespan and accept swelling due to normal operation and degradation during the complete life of the cell. A section 33 of the cooler 22 is in direct contact with one surface of the energy storage device 120, the thin walls allowing cooling fluid 34 in the cooling channels to cool the energy storage device as the fluid flows through the channels 23. The carriers 20 are mounted on one another and fixed together via fittings, such as bolts in fittings 24, 25. Between each water inlet section 106 and outlet section 107 on each carrier 20, a spacer, or washer 29, 28 may be provided.

An advantage is that the cooler 22 of each energy storage device in the module transfers developed heat directly to the cooling liquid through the whole cell surface, on at least one side of the cell. Stacking the integral cells and coolers as shown in FIG. 6 allows the opposite surface of the cell to be cooled by the cooler of the neighbouring cell in the stack, if a thermally insulating layer is not used on that side. The direct contact of cooler and cell in each module makes the cooling more effective than air cooling, or conductive fins with water cooling, so reducing the temperature difference between cell and coolant in normal operation. The stacking arrangement using one cooler to cool two adjacent cells helps to reduce weight and material cost. Another benefit of the direct contact over the surface of the cell, is that this allows the operating temperature of the cooling liquid to be increased, thereby reducing the likelihood of condensation occurring inside the system. The use of polymer plastics materials for the cooler, rather than metal allows weight and cost to be reduced to a fraction of the conventional solutions. In addition, the modules no longer require a cooler block or heat exchanger, as is required with conventional air or water cooled systems, so the volumetric footprint can be reduced. This is particularly useful for marine and offshore applications, where space is at a premium.

A further feature is that, in addition to the thin, lightweight material of the cooling channels between each cell carrying the cooling liquid, allowing effective heat transfer, the cooling system may further comprise sections created in the material of the cooling channels that melt at typical thermal runaway temperatures (i.e. above 170 degrees C.). If a part of the cell is at an elevated temperature, sufficient to cause one or more of these sections to melt, then the cooling system channel has an open point, allowing cooling liquid to come into direct contact with the cell in which thermal runaway is occurring. This additional, active cooling of the cell consumes energy in the burning cell by evaporation of the cooling liquid.

In the event of a section of a cooler melting, due to thermal runaway, or other overheating, forming an opening, there is a large pressure drop, unlike the case in normal operation. As all the coolers of the energy storage modules in the stack are connected in parallel, then cooling liquid from all coolers in the energy storage system flows to the open circuit in the cell suffering a thermal event and exposes that cell to a large amount of cooling liquid, giving a fast reduction in temperature by direct contact of cooling fluid with the overheating cell, to prevent the heat and thermal runaway spreading to neighbouring cells. Actively exposing the critical area to flowing water increases the safety of the energy storage system by very effectively driving the temperature of the cell down. The cooling system is a normally closed system, so the total volume of fluid that goes to cool an overheating cell is limited to the amount that the closed system contains.

A further benefit of this additional feature is that gas and fumes from the cell in which a thermal event is taking place are mixed with water vapour, substantially reducing the flammability of the gas and the gas mixed with water vapour is released to an exhaust system through the battery casing. Mixing the flammable gas with water vapour makes the gas handling in a thermal event less challenging as the flammable gas is mixed with vapour. In addition, there is no need for exhaust cooling and the risk of self-ignition of the hot gas inside the module is substantially reduced, if not removed.

The present invention is described with respect to the example of Li-ion batteries, but is equally applicable to any other type of electrochemical cell based energy storage device, such as alkaline, or nickel-metal hydride (NiMH), or others, as well as to other energy storage technologies, such as capacitors, supercapacitors or ultracapacitors, which may also suffer if the temperature of modules of the stored energy units regularly goes outside an advantageous operating range, reducing the overall lifetime and increasing maintenance costs. For a vessel, or system, relying on stored energy as its primary, or only power source, reliability is particularly important and optimising operating conditions is desirable.

The invention claimed is:

1. A DC energy storage unit, comprising:
   a plurality of energy storage modules, each energy storage module comprising a plurality of electrochemical energy storage devices electrically connected in series;
   an internal control unit in the energy storage module;
   an internal power supply for the internal control unit; and
   a wireless communication system;
   wherein a total voltage of the plurality of energy storage devices in series is greater than or equal to 40 V DC, wherein the plurality of energy storage modules are coupled together in series, or in parallel, each energy storage unit comprising a wireless gateway for communication between the energy storage unit and each energy storage module;
   wherein each energy storage module further comprises a housing, the housing at least partially comprising a non-magnetic material; and,
   wherein the internal power supply comprises one or more of the energy storage devices in the energy storage module, electrically connected to the internal control unit through a rectifying unit.

2. The DC energy storage unit according to claim 1, wherein the non-magnetic material comprises a polymer material, or one of polythene, polyamide, or thermoplastic.

3. The DC energy storage unit according to claim 1, wherein the rectifying unit comprises one of a diode, transistor, rectifying bridge, or thyristor.

4. The DC energy storage unit according to claim 1, wherein the energy storage module further comprises sensors for detecting at least one of temperature, energy storage device voltage, or energy storage device current.

5. A DC power supply system, comprising:
   a plurality of energy storage units according to claim 1;
   a local DC bus connected between each of the energy storage units of the plurality of energy storage units; and
   a system controller for controlling power availability between the local bus and a DC system bus;
   wherein the system controller comprises a wireless communication system for communicating with each of the energy storage units.

6. The DC power supply system according to claim 5, wherein the wireless communication system comprises a node of a wireless network, the network having a ring, mesh, line, bus, fully connected, tree, star, or point to point topology.

7. The DC power supply system according to claim 5, wherein a power supply system voltage is greater than or equal to 500V DC.

8. The DC power supply system according to claim 5, wherein the DC system bus is a system bus of a vehicle, vessel, aircraft, offshore platform, drilling rig, or powered equipment.

* * * * *